United States Patent [19]
Perrault et al.

[11] 3,966,154
[45] June 29, 1976

[54] CABLE HANGER

[76] Inventors: Frederick Perrault, 2644 W. 225th St., Torrance, Calif. 90505; Raymond E. Perrault, 2404 Colt Road, Rancho Palos Verdes, Calif. 90274

[22] Filed: Mar. 19, 1975

[21] Appl. No.: 559,808

[52] U.S. Cl............................... 248/62; 24/269; 248/74 R; 248/74 B
[51] Int. Cl.² ........................................ F16L 3/04
[58] Field of Search .............. 248/59, 60, 62, 70, 248/74 B, 68 R, 74 R, 74 PB, 73, 58; 24/269, 271, 73 SA, 20 TT, 73 B

[56] References Cited
UNITED STATES PATENTS

| | | | |
|---|---|---|---|
| 372,420 | 11/1887 | Leder.................................. | 24/33 |
| 508,822 | 11/1893 | Evory................................. | 248/68 R |
| 1,847,475 | 3/1932 | Donald............................... | 24/271 |
| 2,394,263 | 2/1946 | Reintjes............................. | 248/58 |
| 2,560,845 | 7/1951 | Carpenter et al................ | 248/68 R X |
| 2,655,332 | 10/1953 | Carpenter et al................ | 248/73 |
| 2,826,385 | 3/1958 | Osborn............................... | 248/74 B |
| 2,880,949 | 4/1959 | Fuss.................................... | 248/73 |
| 2,939,664 | 6/1960 | Wesseler........................... | 248/68 R |
| 3,087,700 | 4/1963 | Carpenter et al................ | 248/74 B |
| 3,152,219 | 10/1964 | Murray et al..................... | 248/74 PB X |
| 3,334,851 | 8/1967 | Cassidy et al.................... | 248/62 X |
| 3,633,857 | 1/1972 | Logan................................ | 248/62 |
| 3,819,139 | 6/1974 | Jemison............................ | 248/73 |

FOREIGN PATENTS OR APPLICATIONS

| | | | |
|---|---|---|---|
| 1,542,352 | 9/1968 | France............................. | 24/73 SA |
| 2,139,091 | 3/1972 | Germany......................... | 24/16 PB |
| 1,062,689 | 3/1967 | United Kingdom............ | 24/73 SA |
| 867,892 | 5/1961 | United Kingdom............ | 24/73 SA |

*Primary Examiner*—Roy D. Frazier
*Assistant Examiner*—Rodney H. Bonck
*Attorney, Agent, or Firm*—Gausewitz, Carr & Rothenberg

[57] ABSTRACT

This invention provides a supporting device which includes a bracket having a wall provided with two spaced slots, one edge of each slot being defined by an angular portion of the wall, and a strap, one end of which extends through one of the slots and is doubled over for attaching that end to the bracket, the opposite end having a plurality of tabs extending from one surface and having free transverse edges facing the one end of the strap. The strap at the tabs has a thickness less than the width of the slot when measured at an acute angle to the wall of the bracket, but greater than the width of the slot in a direction generally perpendicular to the wall, so that the strap freely passes through the slot when at an angle and the transverse edges overlap the wall when the strap is more nearly perpendicular to the wall for preventing removal of the strap. The end of the strap extended through the slot in the wall is wound up upon itself to tighten the strap around a cable or the like to be supported, the coiled portion of the strap providing an additional means for holding the strap against withdrawal through the slot.

15 Claims, 7 Drawing Figures

CABLE HANGER

BACKGROUND OF THE INVENTION

1. Field of the Invention

This invention relates to a supporting device particularly adapted for use as a cable hanger.

2. Description of the Prior Art

In supporting cables or the like it is common to provide some sort of supporting bracket and a band or strap which encircles the cable to attach it to the bracket. The attachments commonly are relatively difficult and time consuming to effect, may involve relatively complicated structure and do not always hold a cable securely and with positive assurance that the attachment will be retained.

In the design of U.S. Pat. No. 2,655,332, the band that extends around the cable or other element is wrapped around a tubular bolt after extending through an opening in a supporting bracket to provide an enlarged end to hold the cable against being withdrawn. In U.S. Pat. No. 3,087,700, two straps are employed and are bent together at their ends in a particular pattern to overlap the bracket and secure the cable. In designs such as these, the construction includes auxiliary elements, involves undue expense and may become loosened under severe load or vibration conditions. A plastic cable hanger is disclosed in U.S. Pat. No. 3,819,139, being a unitary member with a slot at one end and teeth on the other end. The teeth are solid and can expand the material of the band at the slot allowing them to be forced through the slot to present shoulders for preventing withdrawal of the end of the strap from the slot. This type of arrangement is limited to use with a stretchable material, not being adapted to construction from metal, inherently being limited in strength and heat resistance.

SUMMARY OF THE INVENTION

The present invention provides an improved supporting device overcoming the difficulties of the prior art, resulting in an attachment which is very easily and rapidly obtained yet which will be much more secure than those of prior devices. The device of the invention includes only two parts, one being a bracket which is adapted for attachment to a supporting structure such as a deck or a bulkhead. The bracket is angled to provide an extended flat wall which has a slot adjacent either of its opposite side edges. These slots are formed by severing the material of the wall transversely and bending up a portion to provide a flange at an acute angle to the principal surface of the wall. The flanges for the two slots face in opposite directions. The second part of the device is a strap for association with the bracket, this being an elongated flat member possessing some resilience. It includes a plurality of tabs adjacent one end, preferably in two longitudinal rows with the tabs in the two rows being transversely aligned. The tabs are deflectable and present free transverse edges facing toward the opposite end of the strap. The thickness of the strap at the tabs is less than the width of the slot taken at an angle to the principal surface of the wall where the slot approaches its maximum dimension. In a direction generally perpendicular to the wall, however, the thickness of the strap at the tabs is less than the width of the slot.

The strap is attached to the bracket at one of the slots by passing the end which is remote from the tabs through the slot and doubling it over. The other end then is extended around the cable or other device to be supported and moved through the other slot at an angle. It moves freely through the slot when inclined because of the dimensional relationship between the tabs and the slot width. As the cable is drawn up toward the wall of the bracket, the angle of the strap becomes more nearly perpendicular and the tabs will not freely pass through the slot, but can be deflected to move through the slot. As this occurs, the transverse edges of the tabs just past the slot will overlap the wall adjacent the slot and prevent removal of the strap from the slot in the opposite direction. In completing the attachment, the end of the strap that has been extended through the slot preferably is wound into a coil to make the strap taut as the transverse edges of the tabs are brought into overlapping relationship with the wall of the bracket. The tabs unyieldingly hold the strap tightly around the cable, forming a secure support. There is redundancy to the support because even in the unlikely event of failure of the tabs at the wall of the bracket, the coiled end of the strap will prevent the strap from being withdrawn through the slot. Moreover, ordinarily there are additional tabs beyond the slot so that if one tab should fail the next will overlap the bracket wall to retain the strap. The tabs are quite strong, being generally rectangular in plan and attached to the strap at two of their edges. The inclusion of two tabs at each transverse position further enhances the strength of the retention of the cable. Thus, a particularly secure connection is made. This is accomplished with a very low-cost assembly which is easily attached and used.

DESCRIPTION OF THE PREFERRED EMBODIMENT

Figure 1:
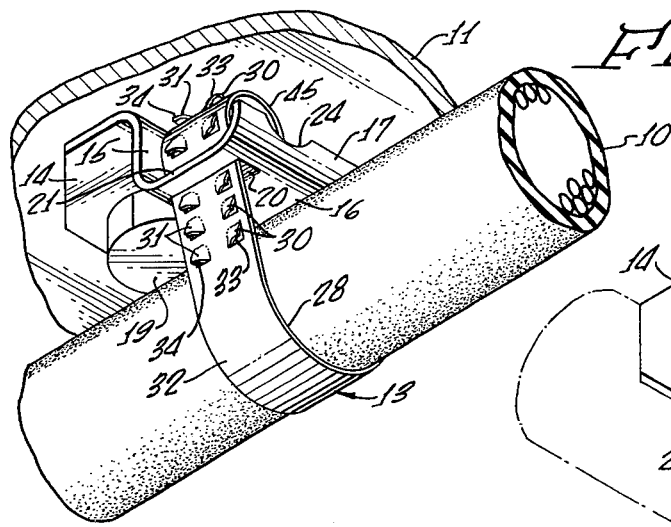
FIG. 1 is a perspective view of the device of this invention used in supporting a cable.

As illustrated in FIG. 1, the device of this invention is used in supporting an insulated electrical cable 10, positioning it adjacent a ship's deck 11. The supporting device consists of two pieces, a bracket 12 and a strap 13. The bracket 12 is of sheet metal bent to provide a relatively broad flat portion 14 at one end, from one edge of which depends an intermediate portion 15 which is substantially at right angles to the portion 14. An additional section 16 connects to the lower edge of the section 15, as the device is illustrated, projecting outwardly at right angles to the section 15 in the opposite direction from the section 14. At the outer edge of the section 16 is a flange 17, bent upwardly so as to be substantially parallel to the intermediate section 15. An opening 18 is provided in the section 14 of the bracket 12 for receiving a screw 19 used in attaching the bracket 12 to the deck 11 or other structure.

In the section 16 of the bracket 12 there are two straight slots 20 extending transversely of the section 16, adjacent and parallel to the opposite side edges 21 of the bracket. The slots 20 are formed by severing the sheet metal of the bracket 12 and bending flanges 22 upwardly away from the flat upper surface 23 of the section 16. The flanges 22 are at the inner edges of the slots 20 and at an acute angle relative to the surface 23 of the section 16 of the bracket.

Two arcuate recesses 24 are provided in the upper edge of the end flange 17 of the bracket 12, each being in a circular segment slightly less than a semicircle. The recesses 24 are positioned just inwardly of the upwardly bent flanges 22 at the slots.

Figure 5:
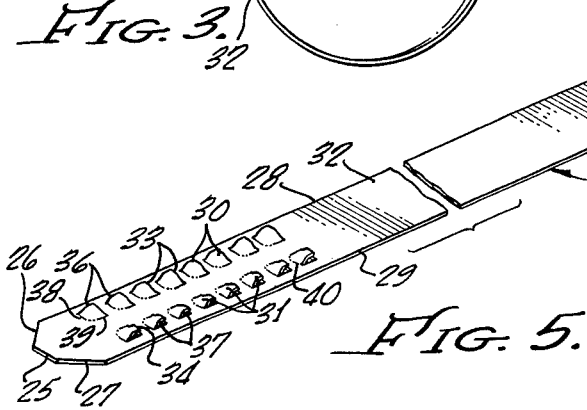
FIG. 5 is a perspective view of the strap prior to association with the bracket.
Figure 6:
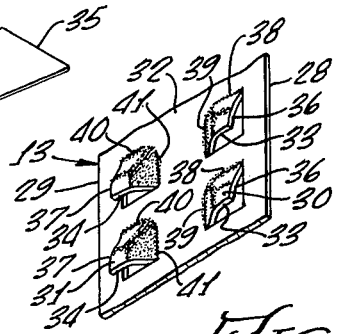
FIG. 6 is an enlarged fragmentary perspective view of the portion of the strap with the tabs.

The strap 13 is an elongated sheet metal element that is flat prior to its association with the bracket 12 (see FIG. 5). At one end 25 of the strap 13 are beveled edge surfaces 26 and 27 that extend from the side edges 28 and 29 to the end edge of the strap. Inwardly of the end 25 are two parallel rows of tabs 30 and 31 extending lengthwise of the strap. The tabs 30 and 31 are formed by making right angle cuts in the strap and deflecting the tabs outwardly of one principal flat surface 32 of the strap. This is accomplished so as to provide free transverse edges 33 and 34 of the tabs 30 and 31, respectively, which are substantially perpendicular to the longitudinal axis of the strap 13 and face away from the end 25 and toward the opposite end 35 of the strap. From the transverse edges 33 and 34 of the tabs extend free longitudinal edges 36 and 37, respectively, which face opposite sides of the strap. The tabs 30 and 31 are roughly rectangular in plan, inclining from their free transverse and longitudinal edges to their lines of attachment with the body of the strap. As a result, the tabs 30 have generally transverse lines of attachment 38 and substantially longitudinal lines of attachment 39 where they join the body of the strap, as best seen in FIG. 6. Similar transverse and horizontal attachments 40 and 41 are made by the other tabs 31. By having this construction, the tabs 30 and 31 are deflectable inwardly yet attached on two sides and so are very strong.

The tabs 30 and 31 are in transverse alignment with each other and are bent transversely in opposite directions. That is to say, the free longitudinal edges 36 of the tabs 30 face toward the side edge 28 adjacent these tabs, while the free longitudinal edges 37 of the other tabs 31 face toward the other side edge 29, which is adjacent the latter tabs.

Figure 2:
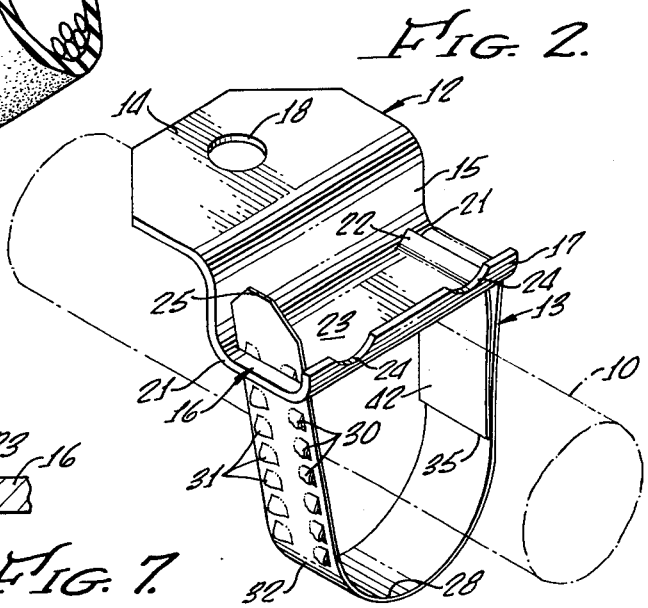
FIG. 2 is a perspective view of the bracket and strap prior to making the final attachment of the strap.
Figure 7:
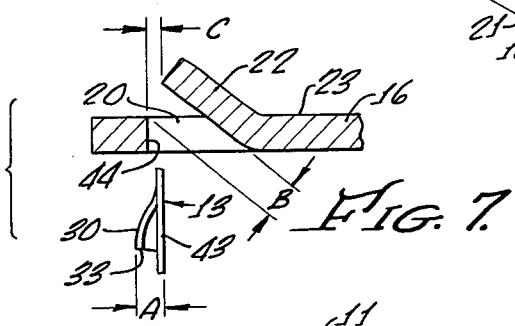
FIG. 7 is an enlarged fragmentary view illustrating the dimensional relationship of the strap and slot in the bracket.
Figure 3:
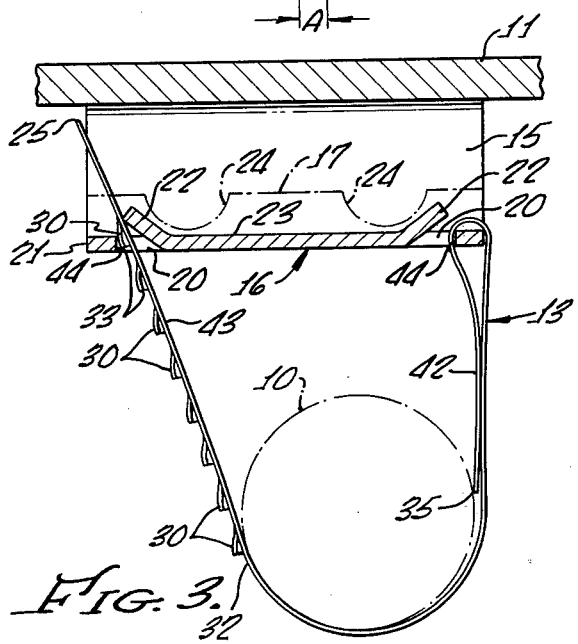
FIG. 3 is an end elevational view with the bracket and strap in the same position as in FIG. 2.

In order to secure the cable 10 or other device to the bracket 12, the end 35 of the strap is inserted through one of the slots 20 and the strap is doubled over so as to provide a short overlapping portion 42 along the inner surface of the strap as the strap is bent around the adjacent side edge 21 of the bracket. The opposite end 25 then is extended through the other slot 20 of the bracket 12. Each of the slots 20 is proportioned such that the tabs 30 and 31 will freely pass through the slot when the strap is at an acute angle to the section 16, such as is illustrated in FIGS. 2 and 3. However, the tabs will not so move through the slot 20 if the strap 13 is made more nearly perpendicular to the section 16 of the bracket 12. This relationship may be seen in FIG. 7, where the distance the tabs 30 and 31 project outwardly from the undersurface 43 of the strap 13 is given a dimension A. The maximum opening through the slot 20, which is measured perpendicular to the flange 22, is represented by the dimension B, while the distance C is the spacing between the end of the flange 22 and the outer edge 44 of the slot 20, measured parallel to the flat surface 23 of the section 16 of the bracket 12. The parts are proportioned so that the maximum slot opening B is greater than the projection A of the tabs 30 and 31 from the undersurface 43 of the strap 13. On the other hand, the tab distance A is greater than the spacing C of the slot opening measured parallel to the surface 23 of the bracket section 16. This means that the strap can move through the slot 20 without interference when it is within a predetermined range of being parallel to the flange 22. However, when the strap is beyond this range of angularity and is within a predetermined range of deviation from being perpendicular to the section 16, its thickness at the tabs is greater than the width of the opening presented by the slot 20.

When the end 25 extends through the slot 20 in the manner shown in FIGS. 2 and 3, ordinarily the object to be supported, such as the cable 10, will be received between the strap and the bracket. The strap is moved through the slot 20 a sufficient amount to cause the cable 10 to approach the bracket 12, as the strap 13 commences to grip the cable. This causes the strap 13 to become more nearly perpendicular to the section 16 of the bracket 12 so that at some point the transverse edges 33 and 34 of the tabs 30 and 31 will overlap the upper surface 23 of the section 16 of the bracket, adjacent the slot 20, preventing the strap from moving in the reverse direction out of the slot. However, the strap can continue to move forwardly through the slot 20 by deflecting the tabs 30 and 31 inwardly as they pass through the slot. Because the strap possesses some resilience, the tabs spring back to their original contour when on the upper side of the section 16 past the slot 20.

Figure 4:
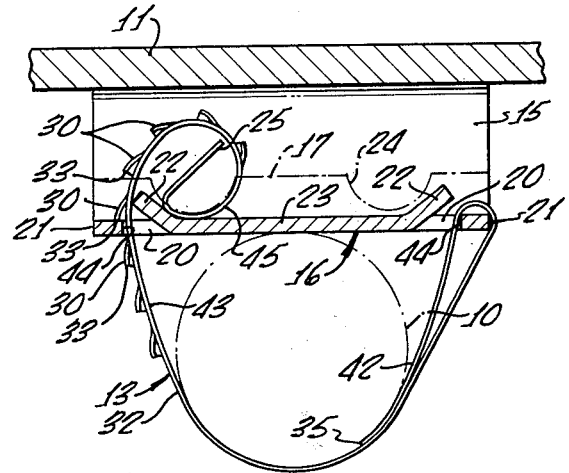
FIG. 4 is an end elevational view of the device with the connection complete.

The final tightening and securing of the cable 10 is accomplished by coiling the end of the strap which has been extended through the slot 20. This may be accomplished by engaging the end of the strap with needlenose pliers and rotating the pliers to produce a wrapped end 45 of the strap, as indicated in FIG. 4. Alternative to the use of pliers, a special tool may be provided with a slotted portion to receive the strap end, preferably with a ratchet drive to facilitate rapid coiling of the end of the strap. The notches 24 in the upper edge of the flange 17 provide clearance for the pliers or other tool used in coiling the end of the strap. The strap end is wrapped up in this manner until the strap is taut and the upper surface of the cable 10 bears against the undersurface of the section 16 of the bracket 12. One set of tabs 30 and 31 then present their transverse surfaces 33 and 34 at the edge of the slot 20, overlapping the upper surface 23 of the section 16 of the bracket so that the tabs prevent the strap from loosening and enable it to tightly hold the cable 10.

There is no danger of the cable's loosening because, even if the tabs 30 and 31 should fail, the coiled end 45 of the strap will preclude reverse movement of the strap through the slot 20 and assure retention of the cable. Moreover, ordinarily there are additional sets of tabs 30 and 31 beyond the slot 20, so that if the tabs which engage the bracket section should fail, the edges of the next set of tabs will be brought to bear against the section 16 of the bracket before the strap moves an appreciable distance. Accordingly, the arrangement of this invention provides a particularly secure and safe retention of the cable 10. The tabs 30 and 31 provide a rigid retention of the strap 13 and will not allow it to gradually work loose. The attachment is accomplished very easily and rapidly by pulling the strap through the slot 20 and wrapping its end to tighten the strap around the cable.

The length of the overlapping portion 42 of the strap 13 should be sufficient to extend past the center of the cable 10 when the strap is drawn tight, as seen in FIG. 4. The cable then engages the overlapped part 42, holding it in place so that the end 35 of the strap will not be pulled through the adjacent slot 20 in the event exceptionally high loads are imposed on the strap.

The position of the strap 13 on the bracket 12 may be reversed from that illustrated because each of the flanges 22 of the slots 20 faces toward the side edge 21 of the bracket adjacent to it. Either of the slots can accommodate the end of the strap that is doubled over, or the end with the tabs. The relationship of the strap 13 to the slots of the bracket 12 can be selected for maximum convenience and accessibility, depending upon the place where the bracket 12 is positioned.

The foregoing detailed description is to be clearly understood as given by way of illustration and example only, the spirit and scope of this invention being limited solely by the appended claims.

We claim:
1. A supporting device comprising:
   a bracket adapted for attachment to a structural element,
      said bracket including a wall having at least one slot therein,
   and a strap defined by an elongated flat member of resilient material, said member having opposite longitudinal edges,
      said member including a plurality of tabs projecting outwardly from one principal surface thereof,
         each of said tabs having a free transverse edge facing one end of said elongated member,
         and a free generally longitudinal edge spaced inwardly from and facing one of said longitudinal edges of said member, the remaining edges of each of said tabs being connected to said member,
      said member at said tabs having a thickness greater than the width of said slot as measured in at least one direction,
      said tabs being deflectable to enable the opposite end of said member to be moved through said slot, whereby said transverse edge of one of said tabs can overlap said wall at said slot when said tabs are so moved through said slot for thereby preventing movement of said member through said slot in the opposite direction,
   said member and said bracket including means for attaching said one end of said member to said bracket.

2. A device as recited in claim 1 in which, said wall is substantially flat and rigid, and in which one edge of said slot is defined by an element positioned at an acute angle to said wall so that said slot in a direction at an acute angle to said wall has a width greater than said thickness of said member at said tabs, and said slot in a direction substantially normal to said wall has a width less than said thickness of said member at said tabs and greater than said thickness of said member at a location remote from said tabs.

3. A device as recited in claim 2 in which for said means for attaching said one end of said member to said bracket said wall is provided with a second slot spaced from said first-mentioned slot, and in which said one end of said member is extended through said second slot so as to provide an inner doubled over portion of said member.

4. A device as recited in claim 3 in which said second slot is identical to said first-mentioned slot for permitting said attachment of said one end of said member to said bracket at either of said slots.

5. A device as recited in claim 2 in which said free generally longitudinal edge of each of said tabs connects to said free transverse edge thereof.

6. A device as recited in claim 5 in which said tabs are in two rows, the tabs in said rows being opposite to each other.

7. A supporting device comprising:
   a bracket adapted for attachment to a structural element,
      said bracket including a substantially flat wall having at least one slot therein,
   and a strap defined by an elongated flat member of resilient material,
      said member including a plurality of tabs projecting outwardly from one principal surface thereof,
         each of said tabs having a free transverse edge facing one end of said elongated member, and a free longitudinal edge extending substantially longitudinally of said member,
         said longitudinal edge connecting to said transverse edge,
      said tabs being substantially rectangular in plan, each of said tabs being attached to said strap at two of the edges thereof,
      said member at said tabs having a thickness greater than the width of said slot as measured in at least one direction,
      said tabs being deflectable to enable the opposite end of said member to be moved through said slot, whereby said transverse edge of one of said tabs can overlap said wall at said slot when said tabs are so moved through said slot for thereby preventing movement of said member through said slot in the opposite direction,
      one edge of said slot being defined by an element positioned at an acute angle to said wall so that said slot in a direction at an acute angle to said wall has a width greater than said thickness of said member at said tabs, and said slot in a direction substantially normal to said wall has a width less than said thickness of said member at said tabs,
   said member and said bracket including means for attaching said one end of said member to said bracket.

8. A device as recited in claim 7 in which,
   said tabs in a first row thereof are adjacent a first longitudinal edge of said member, and said tabs in a second row thereof are adjacent a second longitudinal edge of said member,
   said longitudinal edges of said tabs in said first row facing said first longitudinal edge of said member,
   said longitudinal edges of said tabs in said second row facing said second longitudinal edge of said member.

9. In combination with a cable, a supporting device for said cable comprising:
a bracket,
said bracket including substantially flat first, second and third portions,
said first portion extending in one direction from one edge of said second portion and substantially at right angles thereto,
said third portion extending in the opposite direction from the opposite edge of said second portion and substantially at right angles thereto, said first portion being adapted for connection to a supporting structure,
said third portion being substantially rigid and including a first transverse slot adjacent one side edge thereof and a second transverse slot adjacent the opposite side edge,
each of said slots having an inner edge defined by an element bent outwardly from one side of said third portion at an acute angle thereto,
and a strap of resilient metal,
said strap having opposite longitudinal edges and including a plurality of tabs at one end portion thereof,
each of said tabs having a free transverse edge facing the opposite end of said strap, and a free longitudinal edge spaced inwardly from and facing one of said longitudinal edges, the remaining edges of each of said tabs being integrally connected to said strap,
said strap at said tabs having a thickness which is greater than the width of said slot measured in a direction substantially parallel to said third portion, and less than the width of said slot measured in a direction substantially perpendicular to said element,
such that said end portion of said strap can pass freely through said slot when said end portion of said strap is within a predetermined range of deviation from being parallel to said element, and can pass through said slot in one direction only upon deflecting said tabs when said end portion of said strap is within a predetermined range of deviation from being perpendicular to said third portion,
said one end portion of said strap extending through one of said slots with at least one of said tabs being on said one side of said third portion with said transverse edge facing said third portion,
said end portion of said strap being within said predetermined range of deviation from being perpendicular to said third portion, whereby said transverse edge of said one tab overlaps said third portion and prevents withdrawal of said end portion of said strap from said one slot,
the opposite end portion of said strap being connected to said third portion at the other of said slots, said cable being received between said third portion and said strap between said slots.

10. A device as recited in claim 9 in which said opposite end portion is extended through said other slot and doubled over for forming said connection thereof to said third portion.

11. A device as recited in claim 9 in which said tabs are in two rows with the tabs in said rows being opposite to each other transversely of said strap.

12. A device as recited in claim 9 in which said one end portion beyond said one side of said third portion is rolled into a coil.

13. A device as recited in claim 12 in which said bracket includes a fourth portion projecting from the edge of said third portion remote from said second portion and on one side of said third portion.

14. In combination with a cable, a supporting device for said cable comprising:
a bracket,
said bracket including substantially flat first, second and third portions,
said first portion extending in one direction from one edge of said second portion and substantially at right angles thereto,
said third portion extending in the opposite direction from the opposite edge of said second portion and substantially at right angles thereto, said first portion being adapted for connection to a supporting structure, said third portion including a first transverse slot adjacent one side edge thereof and a second transverse slot adjacent the opposite side edge,
each of said slots having an inner edge defined by an element bent outwardly from one side of said third portion at an acute angle thereto,
and a strap of resilient metal,
said strap including a plurality of tabs at one end portion thereof,
each of said tabs having a free transverse edge facing the opposite end of said strap, and a free longitudinal edge,
said tabs being in two rows with the tabs in said rows being opposite to each other transversely of said strap, said longitudinal edges of said tabs in each of said rows facing outwardly toward the adjacent longitudinal edge of said strap,
said tabs being substantially rectangular in plan, each of said tabs being attached to said strap at two of the edges thereof,
said strap at said tabs having a thickness which is greater than the width of said slot measured in a direction substantially parallel to said third portion, and less than the width of said slot measured in a direction substantially perpendicular to said element,
such that said end portion of said strap can pass freely through said slot when said end portion of said strap is within a predetermined range of deviation from being parallel to said element, and can pass through said slot in one direction only upon deflecting said tabs when said end portion of said strap is within a predetermined range of deviation from being perpendicular to said third portion,
said one end portion of said strap extending through one of said slots with at least one of said tabs being on said one side of said third portion with said transverse edge facing said third portion,
said end portion of said strap being within said predetermined range of deviation from being perpendicular to said third portion, whereby said transverse edge of said one tab overlaps said third portion and prevents withdrawal of said end portion of said strap from said one slot, the opposite end portion of said strap being connected to said third portion at the other of said slots, said cable being received between said third portion and said strap between said slots.

15. A device as recited in claim 14 in which said one end portion beyond said one side of said third portion is rolled into a coil, said bracket includes a fourth portion projecting from the edge of said third portion remote from said portion and on one side of said third portion, and said fourth portion has an outer edge, said outer edge having a recess therein adjacent and inwardly of each of said slots.

* * * * *